(12) United States Patent
Sekine

(10) Patent No.: US 6,476,528 B2
(45) Date of Patent: Nov. 5, 2002

(54) SPINDLE MOTOR ROTOR, INDEX SIGNAL OUTPUT DEVICE, AND FLOPPY DISK DRIVE HAVING THE SAME

(75) Inventor: Mikio Sekine, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/855,437

(22) Filed: May 15, 2001

(65) Prior Publication Data

US 2001/0045786 A1 Nov. 29, 2001

(30) Foreign Application Priority Data

May 26, 2000 (JP) ........................................ 2000-157304

(51) Int. Cl.$^7$ .............................................. H02K 11/00
(52) U.S. Cl. ................................. 310/68 B; 310/156.05
(58) Field of Search ........................ 310/68 B, 156.05, 310/156.33, 156.38, 156.37

(56) References Cited

U.S. PATENT DOCUMENTS

| | | | | | |
|---|---|---|---|---|---|
| 3,801,844 A | * | 4/1974 | Steele | ................... | 310/156.25 |
| 4,737,674 A | * | 4/1988 | Miyao | ................... | 310/156.05 |
| 4,968,913 A | * | 11/1990 | Sakamoto | .............. | 310/156.05 |
| 5,604,389 A | | 2/1997 | Nitta et al. | ............... | 310/67 R |
| 5,637,945 A | * | 6/1997 | Yamamuro et al. | .... | 310/156.05 |
| 5,654,600 A | * | 8/1997 | Nomura et al. | ........ | 310/156.05 |
| 5,777,415 A | * | 7/1998 | Suzuki et al. | .......... | 310/156.05 |

FOREIGN PATENT DOCUMENTS

JP         8-329596         12/1996

* cited by examiner

*Primary Examiner*—Joseph Waks
(74) *Attorney, Agent, or Firm*—Brinks Hofer Gilson & Lione

(57) ABSTRACT

A spindle motor rotor having windows at plural place in a flange of a rotor yoke of a spindle motor; as well as projections producing outwards through the windows, integrally provided in some areas of a ring rotor magnet fitted to the inner circumference of the flange, wherein the rotor magnet is joined to the rotor yoke by welding these projections and one of the projections stretches over both an N pole and an S pole of the rotor magnet.

8 Claims, 6 Drawing Sheets

SPINDLE MOTOR ROTOR, INDEX SIGNAL OUTPUT DEVICE, AND FLOPPY DISK DRIVE HAVING THE SAME

BACKGROUND OF THE INVENTION

1. Field of the Invention

This invention relates to a rotor for a spindle motor having a rotor magnet on its rotor yoke and an index signal output device.

2. Description of Related Art

For a spindle motor which rotates a rotary recording medium such as a floppy disk, one index signal is required per rotation of the disk in order to determine the starting point for writing data or a similar purpose. This index signal is used to detect the rotation of the floppy disk or the motor during the drive of the floppy disk to generate a ready signal for preparation for writing or reading or for the system to start writing upon formatting and stop it after completion of one rotation.

FIGS. 6 and 8 conceptually show the structure of a spindle motor index position detector which detects the index position for the spindle motor by such an index signal. The structure is composed of a reinforcing plate 101 as a metal mount, a circuit board 102 which is superimposed on the reinforcing plate 101 and a rotor yoke 103 constituting the main body of the rotor. The reinforcing plate 101 consists of a metal plate, and integrally provided at three places around the plate are tabs 101a which are bent uprightly like the letter L. These tabs 101a each have a hole 101b for fixing the reinforcing plate 101 on a floppy disk drive case, etc with screws or other fasteners. In addition, at other four places on the periphery of the reinforcing plate 101 are virtually L-shaped chucking claws 101c which are standing upright. These claws 101c hold the circumference of the circuit board 102 superimposed on the reinforcing plate 101 by pressure from above; application of this pressure is achieved by bending some portion of each of the claws 101c horizontally in a dog-legged manner using a tool, as shown in FIG. 7.

The circuit board 102 consists of an insulating substrate which bears a wiring pattern, components for the spindle motor drive circuit and drive control circuit and so on (not shown in the figures); in the center of the circuit board 102 is a bearing hole 102a in which a bearing 104 with a shaft hole 104a, which is attached to the reinforcing plate 101, is protruding upward. On the outer circumference of this protruding bearing 104 is a core 105 having twelve magnetic poles 105a spaced at regular intervals. A stator coil 106 is wound around each of the magnetic poles 105a. These stator coils 106 constitute three coil sets for three phases U, V and W. These three-phase coil terminals 106a and one common coil terminal 106b are soldered to the right-hand land 102b on the circuit board 102. The core 105 consists of a layered core made by laying a plurality of punched silicon steel plates one on top of another. Also a Hall element 107 for detecting the index position for s rotary recording medium is provided opposite to one of the magnetic poles 105a on the circuit board 102.

As shown in FIGS. 9 and 10, the rotor yoke 103 as the main body of the rotor looks like a shallow bowl turned upside down on the circuit board 102, and has an integral ring flange 103a. Attached to the inner circumference of this flange 103a is a rubber or plastic rotor magnet 108 which forms a ring. The entire circumference of this ring is divided into equal parts as, for example, 16 poles which are magnetized as S and N poles alternately. In some portion of the flange 103a is a window 103b with a specified width in which magnets 108a and 108b as integral parts of the rotor magnet 108 are fitted. These magnets 108a and 108b are protruding outwards from the outer circumference 103a of the flange. Alternatively, the magnets 108a and 108b may be separate from the rotor magnet 108 and the separate magnet 108a may be attached to the outer circumference of the rotor magnet 108.

A shaft 109 is passed through the center hole of the rotor yoke 103; the lower half of the shaft 109 can be inserted into the shaft hole 104a of the bearing 104. This enables the rotor yoke 103 to be rotatably mounted on the circuit board 102, covering the stator coils 106, as shown in FIG. 3. The Hall element 107 is located around and opposite to the outer circumference of the flange 103a. Although not shown in the figures, a thrust bearing is provided at the bottom of the shaft hole 104a and the lower end of the shaft 109 is supported by this thrust bearing. Therefore, the shaft 109 can rotate smoothly while being supported by the shaft hole 104a and the thrust bearing. A chuck or similar device is also fitted on the rotor yoke 103 so that the center hub (not shown) of the floppy disk can rest on it and be held in place by it.

In a spindle motor index position detector as mentioned above, when three-phase alternating current from a three-phase AC power supply is supplied to U-phase, V-phase and W-phase stator coils 106 with phase changes in a predetermined order, a magnetic repulsive force is continuously generated between the rotor magnet 108 on the rotor yoke 103 and the coils, which causes the rotor yoke 103 to rotate on the circuit board 102 as part of the stator. The above mentioned electric current changes are performed by making, for example, three Hall elements as position sensors located between the stator coils 106 detect the rotational position of the rotor yoke 103 and using resulting detection signals as current change control signals.

As the rotor yoke 103 of the spindle motor rotates as described above, the magnets 108a and 108b rotate as well, coming near to or going away from the Hall element 107. When the Hall element 107 is away from the magnets 108a and 108b, it is hardly exposed to a magnetic flux generated by the magnets 108a and 108b and thus the detection output is almost zero. When it comes near to the magnets 108a and 108b, it is exposed to a magnetic flux from the magnets 108a and 108b and the detection output increases or decreases depending on the degree of its distance from them. As a result, the detection output Vf from the Hall element 107 is expressed by the equation Vf=kΦ. Consequently, Vf varies in proportion to the amount of magnetic flux inputted to the Hall element 107 as shown in FIG. 11. The detection output is compared with a predetermined reference voltage; a rectangular pulse signal which depends on the result of this comparison is generated and an index signal is generated, for example, at the time of pulse rise of this signal.

The rotor yoke 103 in combination with the rotor magnets 108 constitutes the rotor of the spindle motor; the rotor magnets 108 are attached to the inside of the rotor yoke 103 by gluing, as mentioned above. However, when a glue is applied to the rotor yoke 103 and the rotor magnets 108, it may splash over the surrounding area or overflow the area to be glued. In addition, since it takes a considerable time for the glue to set, it is difficult to decide whether the adhesion is perfect or not, from its external appearance.

SUMMARY OF THE INVENTION

This invention solves the above problem. An object of the invention is to ensure that the rotor magnets are securely fixed to the rotor yoke. Another object of it is to provide a spindle motor rotor and an index signal output device that can accurately detect an index signal generated every rotation of the rotor yoke while distinguishing it from other signals and a floppy disk drive which has the rotor and device.

In order to achieve the above objects, according to one aspect of the invention, the spindle motor rotor has: windows at plural places in the flange of the rotor yoke of the spindle motor; projections, integrally provided in some areas of the ring rotor magnet fitted to the inner circumference of the flange, which protrude outwards through the windows, wherein the rotor magnet is joined to the rotor yoke by welding these projections and one of the projections stretches over both an N pole and an S pole of the rotor magnet.

This configuration clearly differentiates magnetic flux changes given by one of the projections stretching over both an N pole and an S pole, from ones given by the other projections, which are intended to fix the rotor magnet to the rotor yoke, so that it is easy to discern the output of an index signal.

According to another aspect of this invention, in the spindle motor rotor, all the projections other than the one stretching over both an N pole and an S pole serve as either an S or N pole.

This makes it possible to accurately discern a zero-crossing signal whose voltage changes in the positive and negative directions continuously or without any interval, from signals whose voltages intermittently change only in the negative or positive direction.

According to another aspect of this invention, the index signal output device for the spindle motor has a magnetic flux detector for detecting a magnetic flux from each of the projections, located opposite to the outer circumference of the flange.

This enables magnetic fluxes from all the projections on the outer circumference of the flange to be converted into discernible electrical signals.

According to another aspect of this invention, the index signal output device for the spindle motor has an index signal output circuit, connected to a magnetic flux detector, which outputs an index signal when the magnetic flux detector detects zero-crossing positive/negative output.

This makes it easy to differentiate zero-crossing output signals which continuously change from positive to negative and vice versa, from the other non-zero-crossing signals, thereby increasing the index signal detection accuracy.

According to another aspect of this invention, a floppy disk drive has the following: windows provided at plural places in a ring flange on a disc rotor yoke of the spindle motor; projections, integrally provided in some areas of a ring rotor magnet fitted to the inner circumference of the flange, which protrude outwards through the above mentioned windows, and a spindle motor rotor in which the rotor magnet is joined to the rotor yoke by welding these projections, and one of the projections stretching over both an N pole and an S pole of the rotor magnet; and a stator which rotatably supports the rotor and has stator coils for giving a repulsive force to the rotor magnet.

This makes it possible to provide a floppy disk drive which clearly differentiates magnetic flux changes given by one projection stretching over both an N pole and an S pole, from ones given by the other projections intended to fix the rotor magnet to the rotor yoke, and thereby easily discerns the output of an index signal.

According to another aspect of the invention, in the floppy disk drive, all the projections other than the one stretching over both an N pole and an S pole of the rotor magnet serve as either S or N poles.

This makes it possible to provide a floppy disk drive which accurately discerns a zero-crossing signal from the above mentioned one projection which continuously changes from positive to negative and vice versa, from signals which intermittently change only in one direction: either negative or positive.

According to another aspect of the invention, the floppy disk drive has the following: windows at plural places in the ring flange on the disc rotor yoke of the spindle motor; projections, integrally provided in some areas of the ring rotor magnet fitted to the inner circumference of the flange, which protrude outwards through the above mentioned windows; the rotor magnet joined to the rotor yoke by welding these projections; and one of the projections stretching over both an N pole and an S pole of the rotor magnet, wherein a magnetic flux detector for detecting magnetic fluxes from each of the projections is located opposite to the outer circumference of the flange.

This makes it possible to provide a floppy disk drive which can be controlled accurately by converting magnetic fluxes from all the projections on the outer circumference of the flange into discernible electrical signals.

According to another aspect of the invention, the floppy disk drive the magnetic flux detector connected with an index signal output circuit which outputs an index signal when the magnetic flux detector detects zero-crossing positive/negative output.

This makes it possible to provide a floppy disk drive which can be accurately controlled by making it easy to differentiate zero-crossing output signals which continuously change from positive to negative and vice versa, from the other non-zero-crossing signals and thereby increasing the index signal detection accuracy.

BRIEF DESCRIPTION OF DRAWINGS

Preferred embodiments of this invention will be described in detail based on the followings, wherein.

DETAILED DESCRIPTION OF THE PREFERRED EMBODIMENTS

Figure 1:
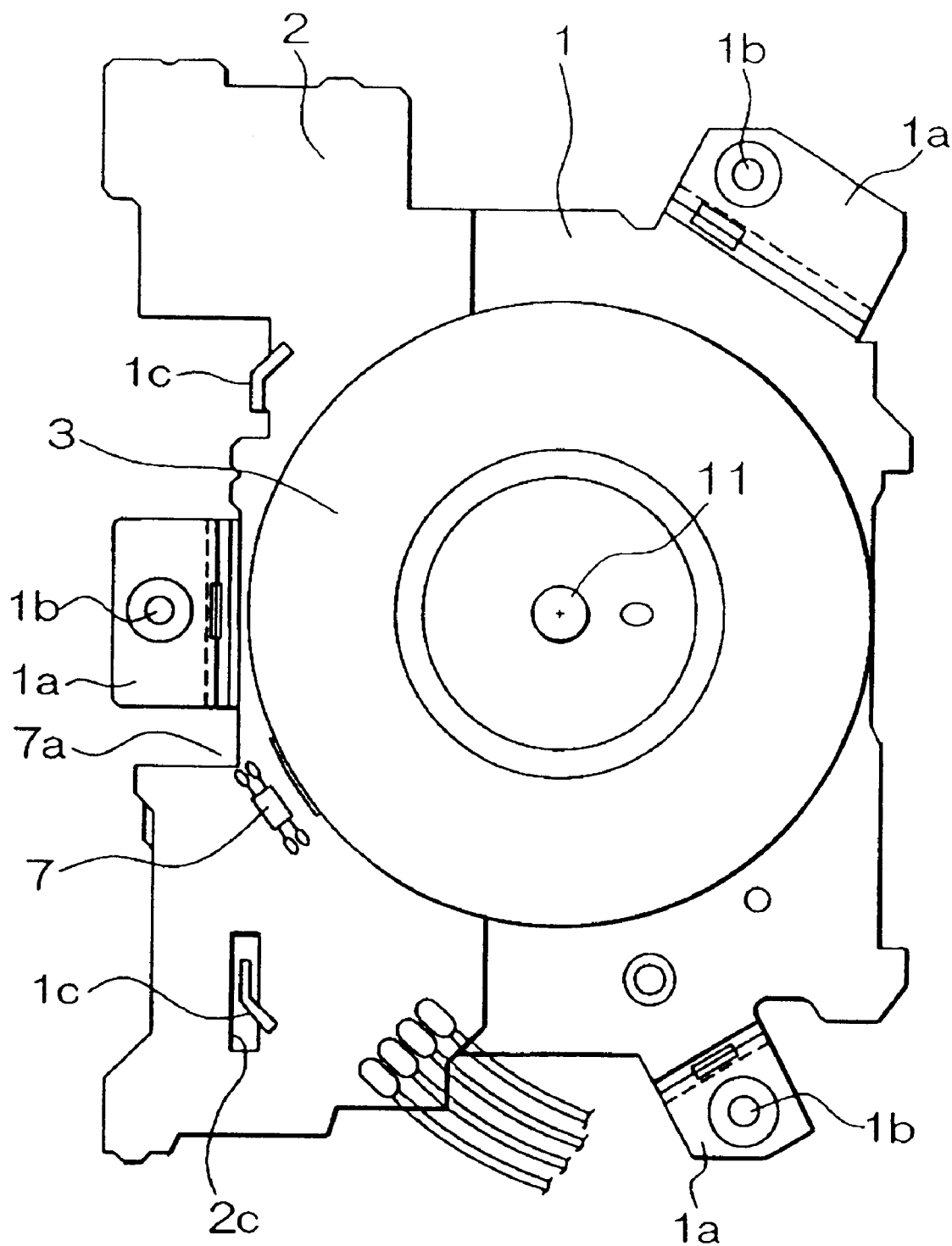
FIG. 1 is a top view illustrating a floppy disk drive according to an embodiment of this invention.
Figure 2:
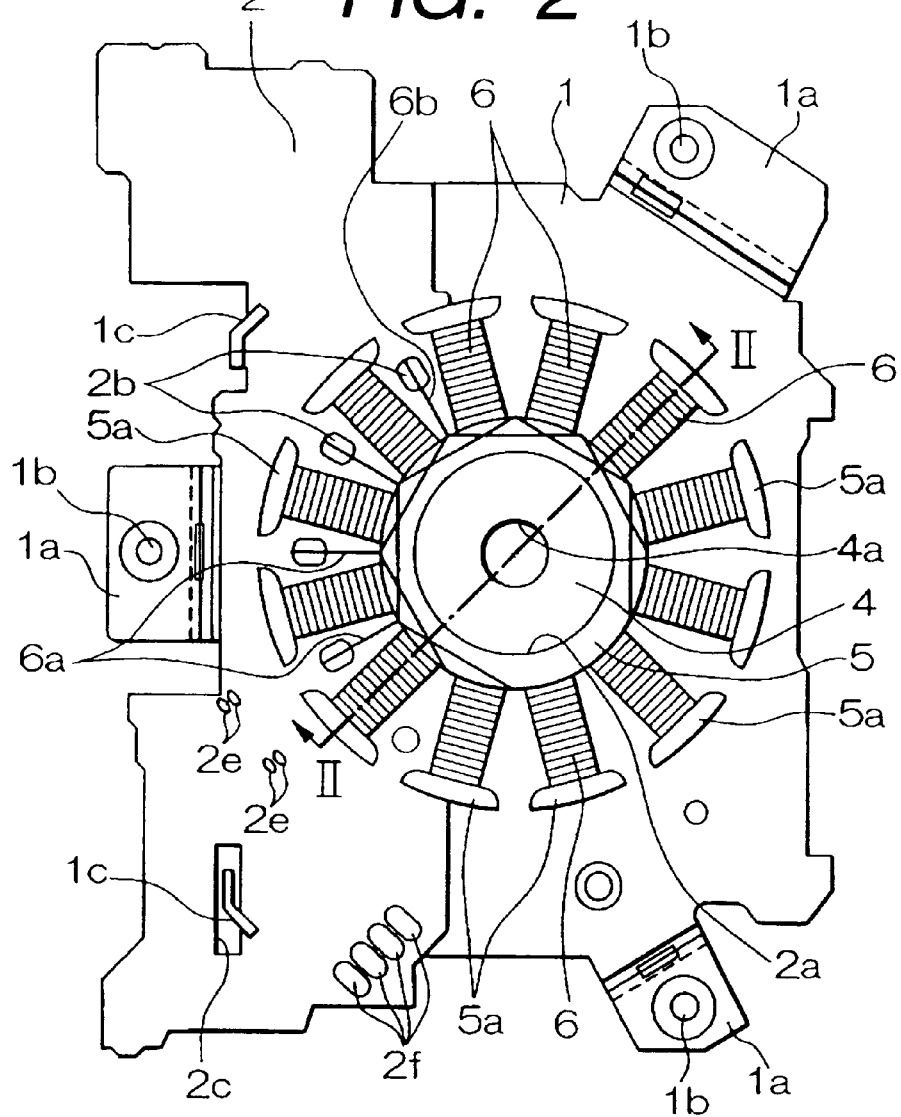
FIG. 2 is a top view illustrating the stator in the floppy disk drive shown in FIG. 1.
Figure 3:
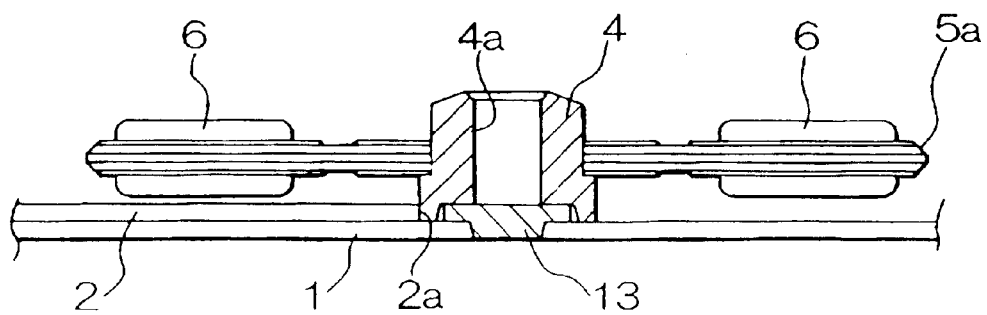
FIG. 3 is a sectional view taken along the line II—II of FIG. 2.

Next, embodiments of this invention will be described in detail. FIGS. 1 through 3 conceptually show a floppy disk drive which has a spindle motor rotor according to this invention. The spindle motor has a circuit board 2, which is superimposed on a reinforcing plate 1, and a rotor yoke 3. The reinforcing plate 1 as a metal mount consists of a metal plate, on the periphery of which are three tabs 1a to be bent upright like the letter L. These tabs 1a each have a hole 1b for fixing the reinforcing plate 1 onto a floppy disk drive case or something like that with screws or other fasteners. In addition, at other four places on the periphery of the reinforcing plate 1 are virtually L-shaped chucking claws 1c which are standing upright. These claws 1c hold the following points on the circuit board 2 superimposed on the reinforcing plate 1 by pressure from above: one point is on the periphery of the circuit board 2 and the other point is part of the periphery of a slit 2c in the circuit board 2. Application of this pressure is achieved by bending part of each of the claws 1c horizontally in a dog-legged manner using a tool, as shown in FIG. 1.

The circuit board 2 consists of an insulating substrate which bears a wiring pattern and components for the spindle motor drive circuit and drive control circuit and so on (not shown in the figures). It is mounted on the side of the reinforcing plate 1 where a Hall element (stated later) is to be installed, occupying only less than one half of the surface area of the reinforcing plate 1. In a side face of this circuit board 2 is a bearing notch 2a (FIG. 3) where a bearing 4 with a shaft hole 4a, which is attached to the reinforcing plate 1, stands protruding upward. On the outer circumference of this protruding bearing 4 is a core 5 having twelve magnetic poles 5a spaced at regular intervals. A stator coil 6 is wound around each of the magnetic poles 5a. These stator coils 6 constitute three sets of coils for three phases U, V and W. The coil terminals 6a for these three phase coils and one common coil terminal 6b are soldered to lands 2b on the circuit board 2.

As shown in FIG. 3, the core 5 consists of a layered core made by laying a plurality of punched silicon steel plates one on top of another. Also, as shown in FIG. 1, there is a Hall element 7 for detecting the index position for a recording medium, in an oblong hole 2d facing one of the magnetic poles 5a. On the circuit board 2 are lands 2e for soldering the lead terminals 7a of the Hall element 7. In one corner of the circuit board 2 are four lands 2f for connecting external leads, which are connected to the lands 2b through the wiring pattern on the circuit board 2. Further, a thrust bearing 13 is fitted into the bottom of the shaft hole 4a of the bearing 4 and the lower end of the shaft 11 is supported by this thrust bearing 13. Therefore, the shaft 11 can rotate smoothly while being supported by the shaft hole 4a and the thrust bearing 13. A chuck or similar device is fitted on the rotor yoke 3 so that the center hub (not shown) of a floppy disk can rest on it and be held in place by it.

Figure 4:
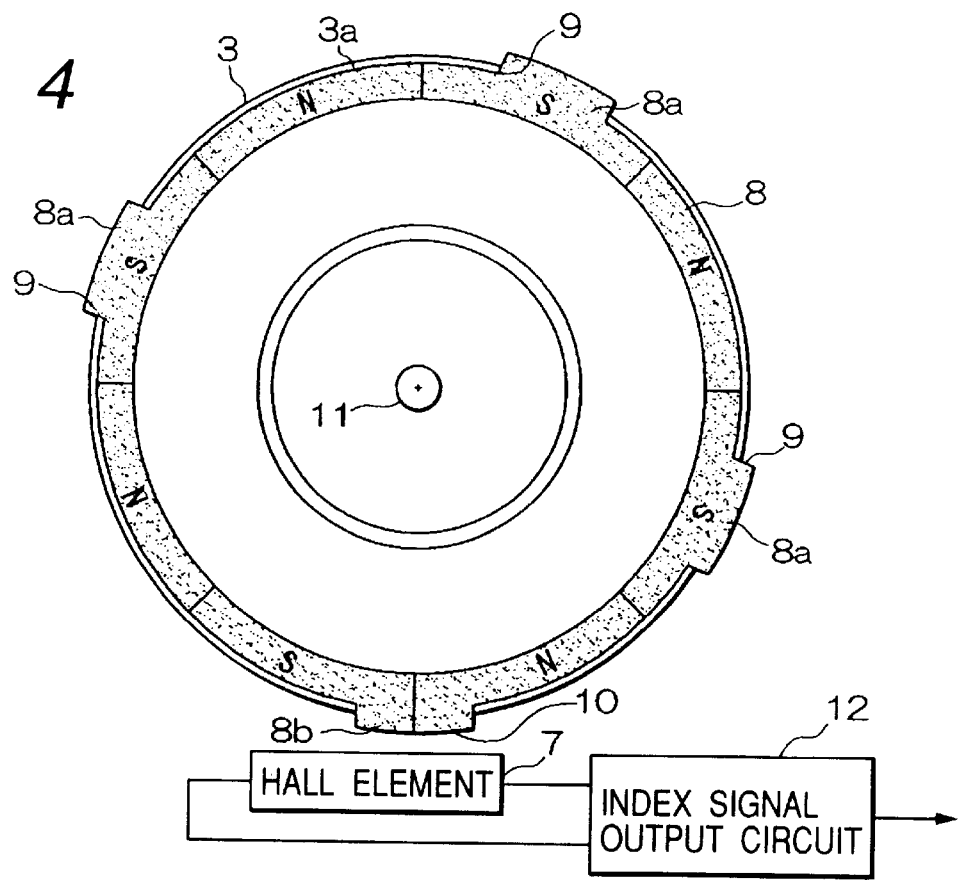
FIG. 4 is a back view illustrating a spindle motor rotor according to one embodiment of this invention.

FIG. 4 conceptually shows the key components of the spindle motor rotor, as viewed from back. The rotor looks like a shallow bowl and consists of a disc rotor yoke 3 with an integral flange 3a on its circumference and a ring plastic rotor magnet 8 attached along the inner circumference of the integral ring flange 3a of the rotor yoke 3. On the entire circumference of the rotor magnet 8 are, for example, eight poles which are magnetized as S and N poles alternately as shown.

In the flange 3a, there are windows 9 in the areas of the rotor magnet 8 which correspond to three S poles, and another window 10 in the area which stretches over both the remaining S pole and an N pole adjacent to it, where each window pierces the flange 3a. Projections 8a of the rotor magnet 8 which correspond to S poles are inserted in the windows 9; the rotor magnet 8 and the rotor yoke 3 are joined together by heating and melting these projections 8a in the areas of the flange 3a which are protruding outwards. The projection 8b of the rotor magnet 8 is inserted in the window 10 or in the above mentioned area of the projection which stretches over both an S pole and an N pole; similarly the rotor magnet 8 and rotor yoke 3 are joined together by heating and melting the projection 8b in the outwardly protruding area of the flange 3a. In this way, the rotor magnet 8 and the rotor yoke 3 are joined together firmly by welding the projections 8a and 8b in the windows 9 and 10, respectively, without using a glue.

A shaft 11 is passed through the center hole of the rotor yoke 3; the lower half of the shaft 11 can be inserted into the shaft hole 4a on the stator side. This enables the rotor yoke 3 to be rotatably laid over the stator coils 6. Located opposite to the outer circumference of the flange 3a is a magnetic flux detector such as a Hall element 7, which is connected with an index signal output circuit 12 as a window comparator which picks up an index signal. The index signal output circuit 12 is based on zero-crossing positive/negative outputs which the Hall element 7 generates upon receipt of a magnetic flux from each of the projections 8a and 8b.

Next, how output of the above mentioned index signal takes place will be explained.

Figure 5:
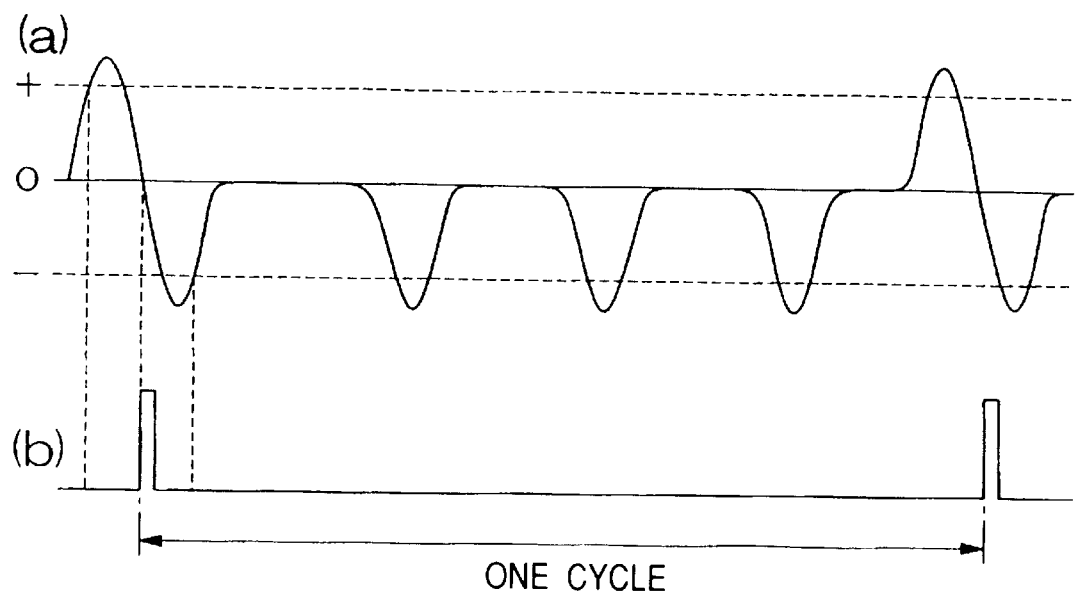
FIGS. 5(a) and 5(b) are timing diagrams for an output signal in the magnetic flux detector and index signal output circuit, shown in FIG. 1.
Figure 6:
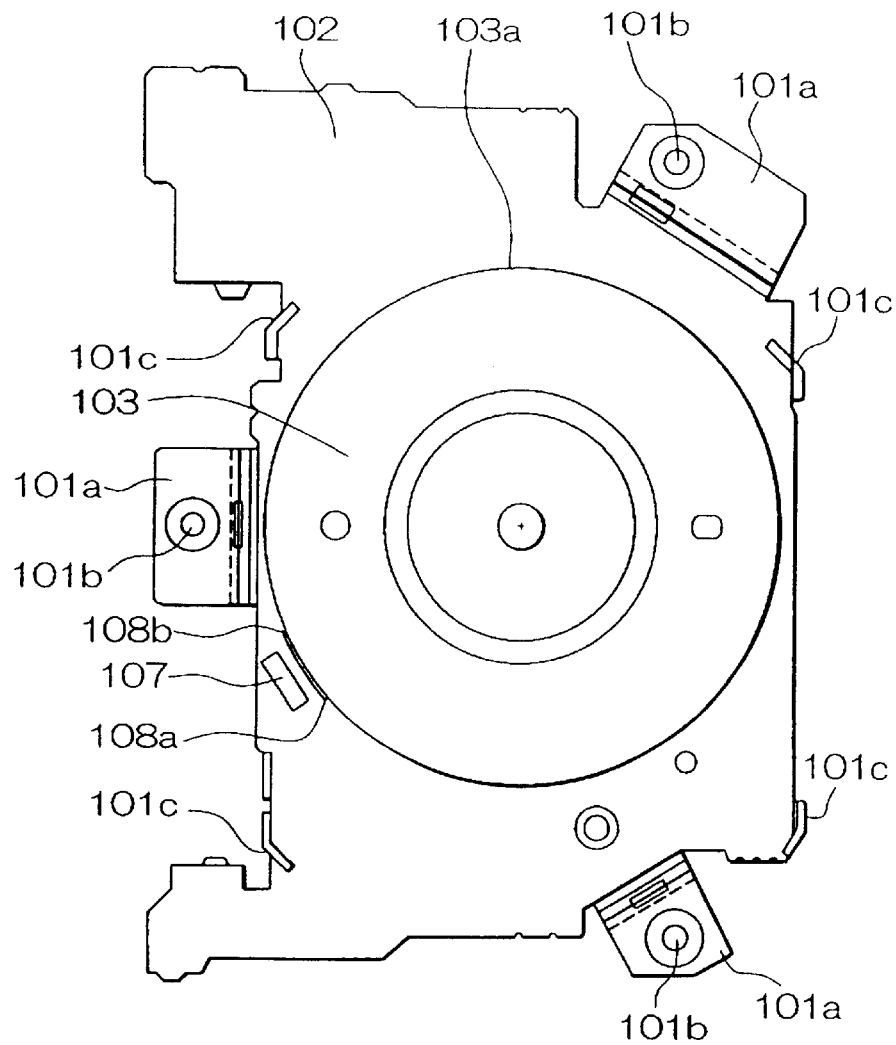
FIG. 6 is a top view illustrating the key components of a conventional spindle motor.
Figure 7:
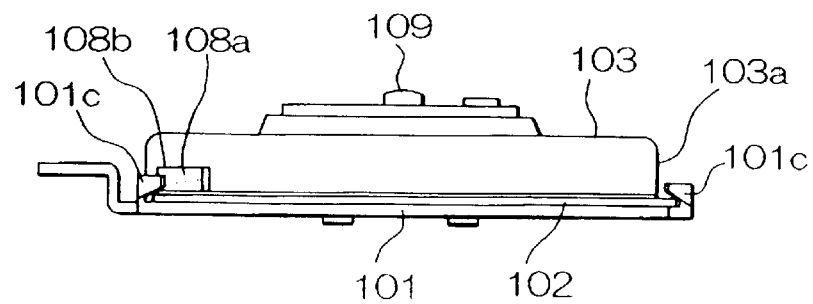
FIG. 7 is a front elevation illustrating the spindle motor shown in FIG. 6.
Figure 8:
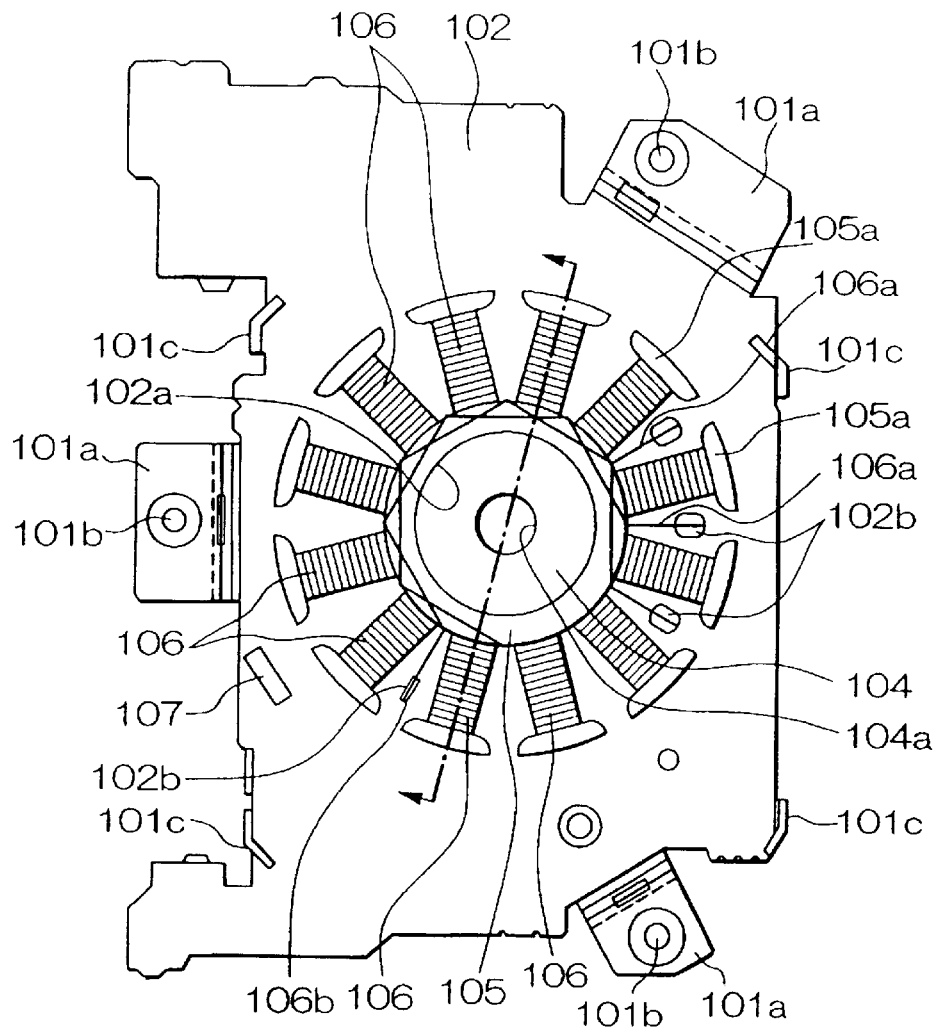
FIG. 8 is a top view illustrating the spindle motor shown in FIG. 7 with its rotor removed.
Figure 9:
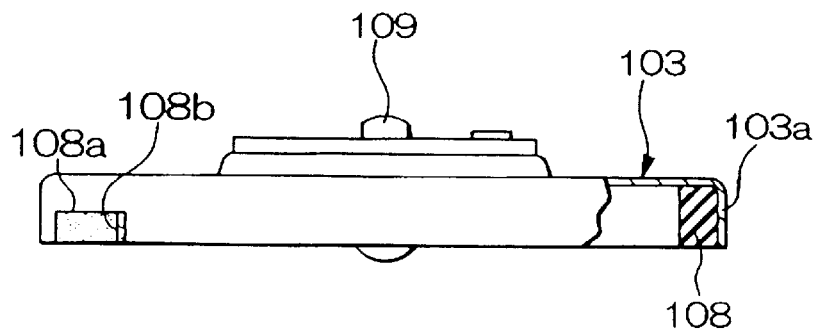
FIG. 9 is a partially sectional front elevation illustrating the rotor shown in FIG. 6.
Figure 10:
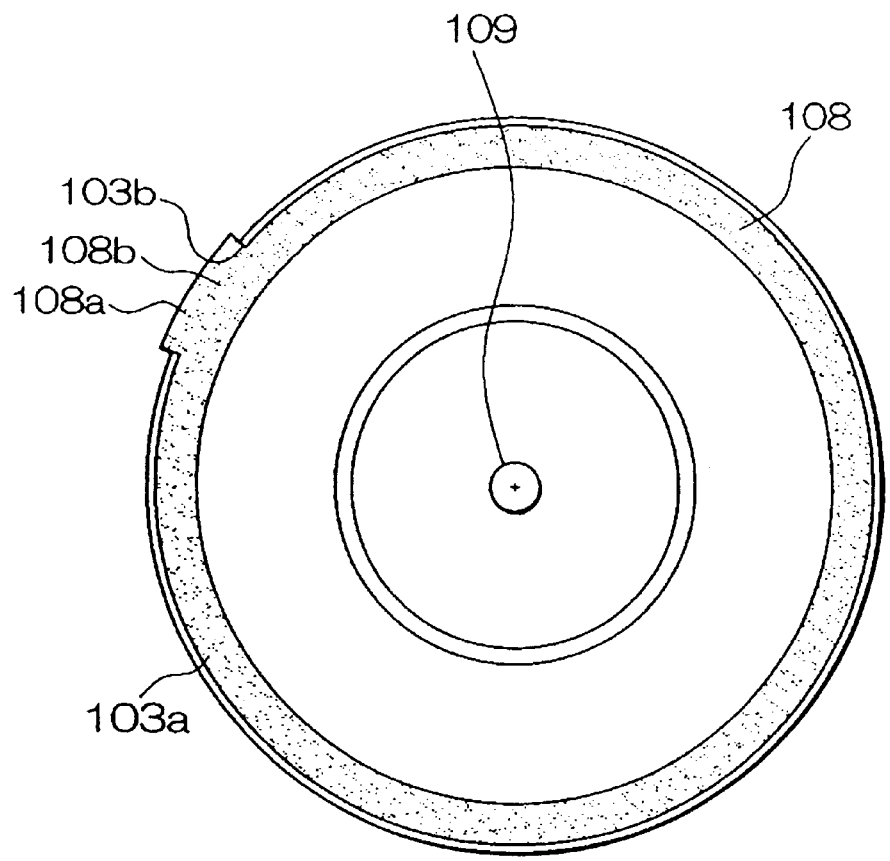
FIG. 10 is a back view illustrating the rotor shown in FIG. 6.
Figure 11:
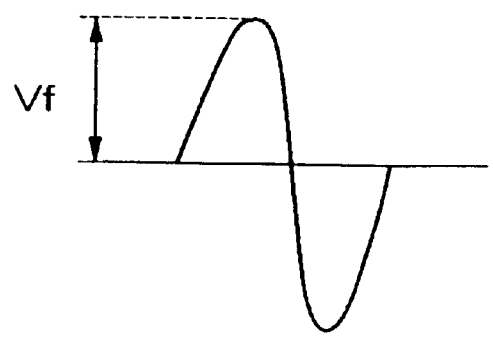
FIG. 11 is a waveform diagram showing the output voltage for the Hall element shown in FIGS. 5(a) and (b)

First, as a three-phase current is supplied to the three-phase stator coils 6 with phase changes in a predetermined order, a magnetic repulsive force is continuously generated between the stator coils 6 and the rotor magnet 8, which rotates the rotor yoke 3 on the stator. During rotation of the rotor yoke 3, magnetic fluxes generated from the three projections 8a and the projection 8b are detected by the Hall element 7. FIG. 5(a) shows the waveform for detection output from the Hall element. The index signal output circuit 12 has a window comparator function which checks whether the detection output from the Hall element 7 as shown in FIG. 5(a) includes a zero-crossing within a given range T for positive/negative output; if there is a zero-crossing, an index signal as shown in FIG. 5(b) is generated.

This index signal is only available when the above mentioned projection 8b of the rotor magnet 8 stretching over both an N pole and an S pole comes near to the Hall element 7; it is clearly distinguished from signals which are generated when any other projection 8a comes near to the Hall element 7. In this case, the projection 8b is welded as the other projections 8a are, so that the rotor yoke 3 and the rotor magnet 8 are firmly joined together.

As discussed above, this invention offers the following advantages. One advantage is that, since one of the rotor magnet projections which protrude from the windows of the flange of the rotor yoke stretches over both an N pole and an S pole, a magnetic flux change from that projection can be clearly differentiated from magnetic flux changes from the other projections which are intended to fix the rotor magnet to the rotor yoke; and this differentiation makes it possible to discern an index signal output easily and accurately.

Another advantage of this invention is that, since all the projections other than the one stretching over both an N pole and an S pole of the rotor magnet serve as either S or N poles, it is possible to accurately discern a zero-crossing signal from the above mentioned one projection which continuously changes from positive to negative and vice versa, from signals which intermittently change only in one direction, either negative or positive, thus allowing an index signal to be accurately generated by a relatively simple circuit.

Furthermore, another advantage of this invention is that, since a magnetic flux detector which detects a magnetic flux from each of the projections is located opposite to the outer circumference of the flange, magnetic fluxes from all the projections on the outer circumference of the flange can be converted into discernible electrical signals, and output and detection of index signals can be done according to these electrical signals.

Moreover, a further advantage of this invention is that, since an index signal output circuit which outputs an index signal when the magnetic flux detector detects zero-crossing positive/negative output is connected to a magnetic flux detector, it is easy to differentiate zero-crossing output signals which continuously change from positive to negative and vice versa, from other non-zero-crossing signals, thereby increasing the index signal detection accuracy.

Hence, this invention provides a floppy disk drive which can accurately and easily discern index signal outputs, and a floppy disk drive which can accurately detect index signals by means of a relatively simple circuit.

What is claimed is:

1. A spindle motor rotor having:
   windows at plural places in a ring flange of a disc rotor yoke of a spindle motor; and
   projections, integrally provided in some areas of a ring rotor magnet fitted to the inner circumference of the flange, which protrude outwards through the windows,
   wherein the rotor magnet is joined to the rotor yoke by welding these projections and one of the projections stretches over both an N pole and an S pole of the rotor magnet.

2. The spindle motor rotor according to claim 1, wherein all the projections other than the one stretching over both an N pole and an S pole of the rotor magnet serve as either S or N poles.

3. A spindle motor index signal output device having:
   windows at plural places in a ring flange of a disc rotor yoke of a spindle motor;
   projections, integrally provided in some areas of a ring rotor magnet fitted to the inner circumference of the flange, which protrude outwards through the windows, the rotor magnet being joined to the rotor yoke by welding these projections and one of the projections stretching over both an N pole and an S pole of the rotor magnet; and
   a magnetic flux detector for detecting a magnetic flux from each of the projections, located opposite to the outer circumference of the flange.

4. The spindle motor index signal output device according to claim 3, wherein the magnetic flux detector is connected with an index signal output circuit which outputs an index signal when the magnetic flux detector detects zero-crossing positive/negative output.

5. A floppy disk drive having:
   a spindle motor rotor having:
      windows at plural places in a ring flange of a disc rotor yoke of a spindle motor; and
      projections, integrally provided in some areas of a ring rotor magnet fitted to the inner circumference of the flange, which protrude outwards through the windows, the rotor magnet being joined to the rotor yoke by welding these projections, and one of the projections stretching over both an N pole and an S pole of the rotor magnet; and
   a stator which rotatably supports the rotor and has stator coils for giving a repulsive force to the rotor magnet.

6. The floppy disk drive according to claim 5, wherein all the projections other than the one stretching over both an N pole and an S pole of the rotor magnet serve as either S or N poles.

7. The floppy disk drive according to claim 5, wherein the magnetic flux detector is connected with an index signal output circuit which outputs an index signal when the magnetic flux detector detects zero-crossing positive/negative output.

8. A floppy disk drive having:
   a spindle motor rotor having:
      windows at plural places in a ring flange on a disc rotor yoke of the spindle motor; projections integrally provided in some areas of a ring rotor magnet fitted to the inner circumference of the flange, the projections protruding outwards through the windows; the rotor magnet is joined to the rotor yoke by welding the projections; and one of the projections stretches over both an N pole and an S pole of the rotor magnet; and
   wherein a magnetic flux detector for detecting a magnetic flux from each of the projections is located opposite to the outer circumference of the flange.

* * * * *

UNITED STATES PATENT AND TRADEMARK OFFICE
CERTIFICATE OF CORRECTION

PATENT NO.  : 6,476,528 B2
DATED       : November 5, 2002
INVENTOR(S) : Mikio Sekine It is certified that error appears in the above-identified patent and that said Letters Patent is hereby corrected as shown below:

<u>Title page,</u>
Item [57], ABSTRACT,
Line 1, delete "place" and substitute -- places -- in its place.
Line 2, immediately after "motor" delete ";" (semicolon) and substitute -- , -- (comma) in its place.

Signed and Sealed this

Eighth Day of April, 2003

JAMES E. ROGAN
*Director of the United States Patent and Trademark Office*